United States Patent [19]

Zimmerman

[11] Patent Number: 5,136,841
[45] Date of Patent: Aug. 11, 1992

[54] AIRCRAFT PROPULSION CONTROL SYSTEM

[76] Inventor: Ward H. Zimmerman, 11044 Auburn Ave. South, Seattle, Wash. 98178

[21] Appl. No.: 581,040

[22] Filed: Sep. 11, 1990

Related U.S. Application Data

[62] Division of Ser. No. 317,292, Feb. 27, 1989, Pat. No. 5,044,155.

[51] Int. Cl.⁵ ............................................. F02C 9/00
[52] U.S. Cl. .................................... 60/233; 60/39.24
[58] Field of Search ............. 60/224, 233, 243, 39.15, 60/39.24, 39.281; 350/96.16, 96.24; 416/25, 30, 33, 34, 35

[56] References Cited

U.S. PATENT DOCUMENTS

| | | | |
|---|---|---|---|
| 4,116,000 | 9/1978 | Martin et al. | 60/39.29 |
| 4,161,650 | 7/1979 | Caouette et al. | 250/199 |
| 4,199,663 | 4/1980 | Herzog | 370/85 |
| 4,249,266 | 2/1981 | Nakamori | 350/96.16 |
| 4,280,185 | 7/1981 | Martin | 364/506 |
| 4,303,976 | 12/1981 | Joby | 364/431 |
| 4,410,948 | 10/1983 | Doniger et al. | 364/431.01 |
| 4,414,804 | 11/1983 | Menard et al. | 60/39.141 |
| 4,545,077 | 10/1985 | Drapala et al. | 350/96.15 |
| 4,551,972 | 11/1985 | Lewis | 60/39.281 |
| 4,653,981 | 3/1987 | Harner et al. | 416/35 |
| 4,655,034 | 4/1987 | Kenison et al. | 60/39.29 |
| 4,799,787 | 1/1989 | Mason | 350/551 |
| 4,843,232 | 6/1989 | Emo et al. | 350/374 |
| 4,875,168 | 10/1989 | Martin | 60/39.281 |
| 4,903,478 | 2/1990 | Seto et al. | 60/39.281 |

FOREIGN PATENT DOCUMENTS

| | | |
|---|---|---|
| 0267397 | 5/1988 | European Pat. Off. |
| 0267398 | 5/1988 | European Pat. Off. |
| 0344389 | 12/1989 | European Pat. Off. |

OTHER PUBLICATIONS

Banbury, "Boeing 757/767 Flight Management Computer System", *Proceedings of The IEEE 1980 National Aerospace and Electronics Conference 1980*, pp. 177–179.

*Primary Examiner*—Louis J. Casaregola
*Attorney, Agent, or Firm*—Dellett, Smith-Hill and Bedell

[57] ABSTRACT

Integration of engine functions and data communications between an aircraft propulsion module and an airframe is enabled by the use of fiber optic links which multiplex information and control functions without risk of an electrical failure in one portion of the aircraft electronics system propagating to other portions of the aircraft electronic systems.

9 Claims, 2 Drawing Sheets

AIRCRAFT PROPULSION CONTROL SYSTEM

This is a divisional of copending application(s) Ser. No. 07/317,292, filed on Feb. 27, 1989. (U.S. Pat. No. 5,044,155)

BACKGROUND OF THE INVENTION

This invention relates to an aircraft propulsion control system.

A modern commercial aircraft comprises an airframe and two or more propulsion modules attached to the airframe. Each propulsion module includes a propulsion engine, which may be a jet engine having a propeller or unducted fan, a fuel source, and electrical generators. Each engine is provided with engine condition sensors and engine control drivers. The engine condition sensors generate condition signals representative of various parameters that characterize the operating condition of the engine, whereas the engine control drivers receive command signals relating to control inputs to the engine and establish the values of those control inputs. For example, the engine condition sensors might sense the temperature and pressure at various locations in the engine, in the manner described in International Publication No. WO 84/04829 published Dec. 6, 1984 (Bluish et al), and the engine control drivers might include a fuel metering valve and a stability bleed valve. Each propulsion module also includes an engine electronic control unit which receives signals provided by the engine condition sensors and delivers them to the airframe, and receives command signals provided by the airframe and delivers them to selected engine control drivers.

Prior to the use of engine electronic control units, the pilot had quasi-direct control over some individual engine functions. For example, to issue a thrust command the pilot provided a bias to the fuel metering valve and aircraft devices also introduced a bias to the fuel metering valve as a means to coordinate the engine parameters and maintain stable engine operation. However, it was not a precise form of control as the amount of thrust actually delivered depended on altitude, Mach number, and temperature. To achieve the desired level of thrust, the pilot monitored engine parameters and manually readjusted the fuel command so that the engine parameters corresponded with a handbook lookup table.

Currently, an engine electronic control unit performs the required coordination of engine parameters. The pilot issues a thrust command to the engine electronic control unit, and the control unit establishes the desired level of thrust without further pilot input. Each engine electronic control unit has two functionally identical channels, and each channel is able to read from the engine condition sensors and write to the engine control drivers. In an aircraft having two engine propulsion modules, each engine has sufficient power to keep the aircraft airborne by itself. Therefore, a fault in one channel of one engine electronic control unit will not result in catastrophic loss of power so long as at least one of the other three channels continues to operate.

The engine electronic control unit is responsible for monitoring sensor parameters such as engine RPM, engine combustion pressure, and exhaust gas temperatures and in response to these parameters the engine electronic control unit directs engine control functions such as stability bleed and fuel metering to maintain the engine in a stable operating condition, and the pilot need only provide a thrust command. In performing these functions, the engine electronic control unit must have access to non-engine unique data including aircraft altitude, Mach number, and air temperature. In current engine electronics systems, this data is provided by dedicated electrically conductive wires running from the engine electronic control unit to the particular aircraft component providing such data. However, dedicated electrically conductive signal paths between a control unit and each aircraft component requiring communication with the control unit are undesirable because of the number of connections required and the potential for a fault in the airframe or either of the engines to follow that electrically conductive path and cause all engines to fail.

The airframe includes flight deck controls and flight deck displays. The flight deck controls include command transducers for issuing command signals to the engine electronic control units, and the flight deck displays receive the condition signals generated by the engine condition sensors and provide displays of the values represented by those signals. The flight deck controls communicate with each engine control unit by dedicated electrically conductive wires. Most of the flight deck displays may receive engine related data by way of digital data bus(es); particular flight deck displays, such as fire warning and overheat indication, may receive their data from the engine by way of separate dedicated electrically conductive wires.

Multiple engine aircraft may include apparatus for synchronizing engine RPM and/or phase in order to reduce cabin noise and structural vibration. Such apparatus normally includes an isolation station mounted on the airframe and coupled to each engine by electrically conductive signal paths. The isolation station thereby provides electrically isolated engine-to-engine communication. However, use of an electrically conductive signal path and an isolation station on the airframe to provide engine-to-engine communication is undesirable because it becomes difficult to enforce such isolation. It is not possible to guarantee that the isolation will remain because for some unanticipated reason, it is possible for a user to tie into the isolation station and violate the engine-to-engine isolation.

Because of the complexity of modern aircraft, numerous signal-carrying connections pass through connectors forming an airframe/propulsion module interface. In order to insure that the danger of connector failure will not impair the reliability of the aircraft, the signal paths of each channel are provided by way of separate connectors, and this in turn increases the number of connections. There may be several hundred electrical connections accommodated by multiple connectors. Each connector comprises an airframe part and an engine part, connected together in releasable fashion. There is always a possibility that the two parts of a connector will separate or that individual pin connections will fail resulting in interruption of the connections that should be provided by that connector. Each connection between the propulsion module and the flight deck controls or flight deck displays increases the cost of wiring, the mass of the aircraft, and the probability of fault due to connector failure.

The problem of electrical fault propagation is a paramount concern in aircraft electronic systems. Current safety practices do not allow multiple engine electronic controls to interface with or connect directly to an electrically conductive universal bus because an electrical fault, e.g. a short or an electric impulse caused, for example, by lightning, in one aircraft component can spread into other components by way of the bus.

SUMMARY OF THE INVENTION

A preferred embodiment of the present invention in a first aspect is an aircraft comprising an airframe and at least one propulsion module attached to the airframe. Signals are passed between the propulsion module and the airframe along an optical communication path from the propulsion module to electro optic transducers operating on an electrically conductive airframe bus. Computer and control devices of the airframe also operate on the bus such that the propulsion module may communicate with these airframe devices without exposure to an electrical fault originating on a device operating on the bus.

A preferred embodiment of the invention in a second aspect is an aircraft that includes an airframe having an optic signal communication path and at least two propulsion modules attached to the airframe. The propulsion modules communicate directly by way of the optic signal communication path to exchange, for example, engine RPM and propeller phase information.

Thus, in the preferred embodiment of the present invention, aircraft components including propulsion modules may be interconnected while maintaining suitable electrical isolation. Electrical isolation provided by optic fiber connections eliminates propagation of electrical faults and permits use of an electrically conductive universal bus making all aircraft data directly available to the propulsion modules without requiring a large number of connections at the airframe/propulsion module interface. Optic fiber connections between individual propulsion modules and the airframe and between propulsion modules, establish direct engine-to-engine and engine-to-airframe communication without risk of electrical fault propagation therebetween.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
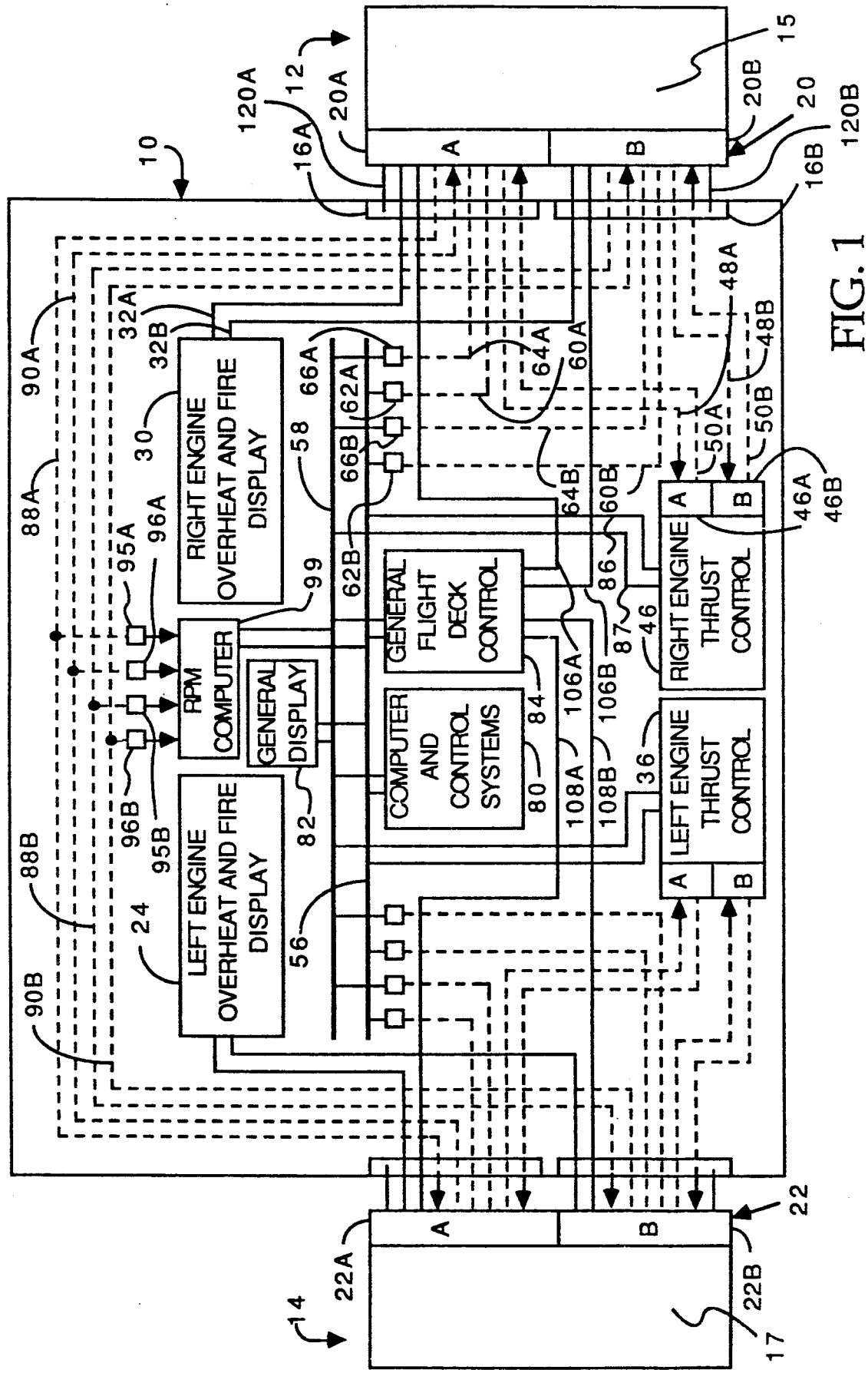
FIG. 1 is a partial simplified block diagram of an aircraft having a propulsion control system according to the present invention and including an airframe, a right propulsion module, and a left propulsion module.

FIG. 1 illustrates an aircraft including an airframe 10, a right propulsion module 12, and a left propulsion module 14. Propulsion modules 12 and 14 are attached to airframe 10 and each provides sufficient thrust to maintain flight. Propulsion module 12 comprises a jet engine 15, which drives a propeller (not shown), and an engine electronic sense and control subsystem 20. As will be discussed more fully hereinafter, engine electronic sense and control subsystem 20 includes engine sensors for delivering engine condition data to airframe 10, and engine control electronics which receive control commands from airframe 10 and respond by executing engine control functions. (Engine electronic sense and control subsystem 20 has two identical channels, designated 20A and 20B respectively. Left propulsion module 14 includes engine 17 and engine electronic sense and control subsystem 22 having channels 22A and 22B which, unless otherwise stated, operate in a manner similar to channels 20A and 20B of subsystem 20, respectively. As will be described in further detail below, one of the channels (e.g. channel 20A) is designated as master, or channel-in-command, and controls operation of engine 15, while the other channel (channel 20B) is designated as slave and does not participate in engine control unless master channel 20A relinquishes control. The following description will focus on master channel 20A, it being understood that the description of channel 20A is applicable to channel 20B when channel 20B functions as master channel. The description of a component designated by a reference numeral and the suffix A is applicable to the component designated by the same reference numeral and the suffix B.

Engine electronic sense and control subsystem 20 communicates with airframe 10 by way of optic fiber connections, shown as dashed lines, and electrically conductive connections, shown as solid lines. Connectors 16A and 16B form the interface between airframe 10 and right propulsion module 12 with channel 20A being coupled through connector 16A and channel 20B being coupled through connector 16B. Each of connectors 16A and 16B may be a hybrid connector including both optic fiber and electrically conductive connections, or may comprise a pair of separate connectors, one for optic fiber connections and the other for electrically conductive connections.

Airframe 10 comprises display and control devices associated with a particular propulsion module and coupled to the associated module by way of dedicated signal carrying connections. Right engine overheat and fire display 30 receives signals by way of electrical conductors 32A and 32B from fire detect and overheat sensors 132A and 132B (FIG. 2) of channels 20A and 20B, respectively (not via the engine control electronics). As will be discussed more fully hereafter, each conductor 32 actually comprises four electrically-separate, electrically conductive wires. Right engine thrust control 46 includes separate channels 46A and 46B with channel 46A communicating with channel 20A by unidirectional optic fibers 48A and 50A, and channel 46B communicating with channel 20B by unidirectional optic fibers 48B and 50B. Left engine overheat and fire display 24 and left engine thrust control 36 are coupled to left propulsion nodule 14 in similar fashion.

Channels 46A and 46B of right engine thrust control 46 issue a thrust command to channels 20A and 20B, respectively. Engine electronic sense and control subsystem 20 coordinates operation of the various parts of engine 15 to make sure that a thrust increase or decrease is effective without causing an unstable operating condition. Engine electronic sense and control subsystem 20 includes memory-resident look-up tables specifying acceptable combinations of engine control parameters and these tables are utilized to accomplish a suitable change in operation of engine 15. For example, if fuel supply rate is decreased too rapidly, then engine 15 will flame out because there will be more air coming in than can be supported with the amount of fuel. In response to a command for a decrease in thrust, sense and control subsystem 20 must decrease the rate at which air enters engine 15 while coordinating a reduction in the rate at which the fuel enters engine 15 according to a deceleration schedule. The fuel supply rate is not abruptly reduced to zero when the pilot commands a minimum thrust, but the fuel and air must be reduced in a coordinated manner and this responsibility is executed by the sense and control subsystem 20 of the propulsion module.

Channel 46A of control 46 receives an optic signal from channel 20A through optic fiber 48A. Control 46 then modulates, i.e., in frequency or magnitude, the received opt-c signal according to the position of a thrust control lever (not shown) on control 46. The position of the thrust control lever is representative of the desired engine thrust. Channel 46A of control 46 returns the modulated optic signal to channel 20A by way of optic fiber 50A. Channel 20A detects the modulation signal and utilizes the detected modulation signal as a thrust command signal. Left engine thrust control 36 interacts with left propulsion module 14 in similar fashion.

A second method (not shown) of delivering a thrust command to channel 20A of sense and control subsystem 20 would be to utilize a group of optic fibers in place of optic fiber 50A and reflect the optic signal received along optic fiber 48A into an optic fiber of the group according to the position of the thrust control lever. The thrust command :s derived by determining which optic fiber carries the reflected optic signal.

In a third method (not shown) of delivering a thrust command to engine electronic sense and control subsystem 20, five wires connect channel 20A and channel 46A. Within channel 46A, a single primary coil is excited by a current carried by two of the wires from channel 20A and a ferromagnetic slug is positioned between the primary coil and two matched secondary coils according to the position of the thrust lever. Currents that are induced in the matched secondary coils according to the position of the slug are delivered to channel 20A through the remaining three wires and sense and control subsystem 20 deduces the thrust command from the signal on these wires.

Airframe 10 also includes electrically conductive universal data bus 56 and electrically conductive universal data bus 58. Buses 56 and 58 are redundant components, each carrying the same data and acting as a backup for the other in the event that one of buses 56 and 58 fails. Bus 56 and bus 58 may be conventional parallel or serial buses for providing communication among devices operating thereon. However, in the preferred embodiment of the present invention bus 56 and bus 58 are DATAC buses as described in U.S. Pat. Nos. 4,199,663 and 4,471,481.

Channel 20A of sense and control subsystem 20 communicates with bus 56 by way of bi-directional optic fiber 60A and electro optic transducer 62A which operates on bus 56 while bi-directional optic fiber 64A and electro optic transducer 66A link channel 20A to bus 58. Electro optic transducers 62A and 66A convert signals provided in optical form by channel 20A into electrical form for application to bus 56 or bus 58, and convert signals provided in electrical form by bus 56 or bus 58 into optical form for communication with channel 20A. Channel 20B is coupled to bus 56 through optic fiber 60B and electro optic transducer 62B, and to bus 58 through optic fiber 64B and electro optic transducer 66B. Each of channels 22A and 22B of module 14 communicates with bus 56 and bus 58 through a similar arrangement of optic fibers and electro optic transducers. Modules 12 and 14 are thereby coupled for engine-to-engine communication by way of buses 56 and 58, and for communication with other devices operating on buses 56 and 58.

Computer and control systems 80, general display 82, and general flight deck control 84 each communicate directly with bus 56 and bus 58 by electrically conductive signal paths. Computer and control systems 80 include electronic devices such as an automatic flight control, a flight management computer, an air data inertial reference unit, an environmental control system and a central maintenance computer. General display 82 provides a visual indication of engine conditions based upon data collected from bus 56 and bus 58. Flight deck control 84 includes normal flight controls, other than thrust control, for exercising control over the engines during operation of the aircraft and places engine control commands on bus 56 and bus 58 for delivery to modules 12 and 14.

If a reverse thrust enable command is generated by right engine thrust control 46, it is routed to right propulsion module 12 through bus 56 and bus 58. Right engine thrust control 46 is connected to bus 56 and bus 58 by way of electrical conductors 86 and 87, respectively, for placing the reverse thrust enable command on bus 56 and bus 58 while optic fiber 60A and optic fiber 64A communicate the reverse thrust enable command from bus 56 and bus 58, respectively, to channel 20A. Conductors 86 and 87 each connect to a reverse thrust enable switch within control 46 which is isolated from other portions of control 46 and airframe 10.

Engine-to-engine communication of certain parameters, e.g. engine RPM and propeller phase, is established by unidirectional optic fiber signal paths. Optic fibers 88A and 90A link channel 20A of right propulsion module 12 with channel 22A of left propulsion module 14. Optic fibers 88B and 90B couple channel 20B and channel 22B in similar fashion. Fibers 88A, 90A, 88B and 90B are coupled to electro optic transducers 95A, 96A, 95B and 96B, respectively, for providing data traveling along optic fibers 88 and 90 to RPM computer 99 which operates on buses 56 and 58. Computer 99 processes the engine RPM and propeller phase information and provides this data to buses 56 and 58. General display 82 accesses buses 56 and 58 to collect engine RPM information for pilot observation.

The engine-to-engine communication link provided by fibers 88 and 90 permits propulsion modules 12 and 14 to exchange information. Propeller phase and engine RPM are exchanged for coordinating each engine with respect to the other. By synchronizing propeller phase and engine RPM, it is possible to significantly reduce cabin noise and potentially harmful structural vibration that might be present when such synchronization is not achieved. In current engine synchronization schemes, it is necessary to couple each engine to a common control box on the airframe, provide electrical isolation within the control box, and designate one engine as a master engine and the other as a slave. The control box determines the RPM of the slave engine with respect to the master and commands the slave to slow down or speed up to match the speed of the master. However, it is more desirable to speed an engine up and provide more thrust than it is to slow down an engine in order to match RPM. In the preferred embodiment of the present invention, each propulsion module receives RPM information for the other propulsion module and is able to determine which propulsion module has the higher engine RPM at the time synchronization is enabled. The engine with the higher RPM becomes the master and commands the engine with the lower RPM, the slave, to speed up to match the RPM of the master engine. If both engines have identical RPM, one engine is designated master by default. The slave engine follows the RPM of the master engine until synchronization is disabled by pilot command or until the master engine changes RPM at a rate exceeding some predetermined value representing engine failure or shutdown. In this manner, an airframe control box is not needed and sense and control subsystems 20 and 22 are used to compare engine RPM and determine whether an RPM adjustment is necessary.

General flight deck control 84 communicates with channel 20A of sense and control subsystem 20 over an electrical conductor 106A while channel 20B is coupled to control 84 through conductor 106B. As will be discussed more fully hereafter, each conductor 106 actually comprises four electrically-separate, electrically conductive wires. Conductors 108A and 108B similarly link control 84 to channels 22A and 22B of module 14.

A limited number of electrically conductive connections are used for components of airframe 10 dedicated to a particular propulsion module, and electrical isolation is provided within such components. For example, right engine overheat and fire display 30 is dedicated to the right engine and has an electrically conductive signal connection, i.e., conductors 32A and 32B, to right propulsion module 12. Electrical components within display 30 and connected to conductors 32A and 32B are isolated from electrical contact with other components of airframe 10. General flight deck control 84 is connected to propulsion modules 12 and 14 by conductors 106 and 108, but electrical isolation is provided within control 84 between devices associated with right propulsion module 12, devices associated with left propulsion module 14, and those devices associated with the airframe generally and operating on bus 56 and bus 58.

Optic fiber connections establish a communication link that is not practicable by an electrically conductive signal path due to the risk of electrical fault propagation or the number of connections required. For example, propulsion module 12 has access to all data available on bus 56 and bus 58 and may communicate with all devices operating on bus 56 and bus 58, but optic fibers 60 and 64 shield propulsion module 12 from exposure to an electrical fault originating in a device operating on bus 56 or bus 58. Optic fibers 88 and 90 provide engine-to-engine communication without compromising complete engine-to-engine electrical isolation.

Thus, the signal carrying connections shown in FIG. 1 provide engine-to-engine isolation and channel-to-channel isolation. Propulsion module 12 is electrically isolated from airframe 10 with the exception of display 30 and portions of flight deck control 84, each being dedicated to a propulsion module 12 and isolated from the remainder of airframe 10. An electrical fault originating in a device operating on bus 56 or bus 58 cannot reach module 12 and an electrical fault originating in one of the propulsion modules cannot reach the other propulsion module by way of bus 56 or bus 58, or by way of optic fibers 88 and 90. It can also be seen that connectors 16A and 16B provide channel-to-channel isolation for propulsion module 12 such that failure of one connector affects only one channel.

Propulsion modules 12 and 14 are substantially identical and are interchangeable, i.e., may be switched from right to left and left to right. However, it is necessary for proper operation to configure a propulsion module differently depending on whether it is the right or left propulsion module. For example, engine related information appearing on bus 56 and 58 is tagged with an identification field for association with a particular propulsion module. The propulsion modules must deliver data to bus 56 and bus 58 with the proper tag so that the data may be associated with the correct propulsion module, and each must only respond to commands on bus 56 and bus 58 having the proper tag. Conductors 120A and 120B extend from channels 20A and 20B, respectively, and into the associated connectors 16A and 16B. As will be discussed more fully hereafter, conductors 120 each comprise four wires, and jumpers (not shown in FIG. 1) within connectors 15A and 16B couple selected pairs of wires within each conductor 120 to configure propulsion module 12 as a right propulsion module.

Figure 2:
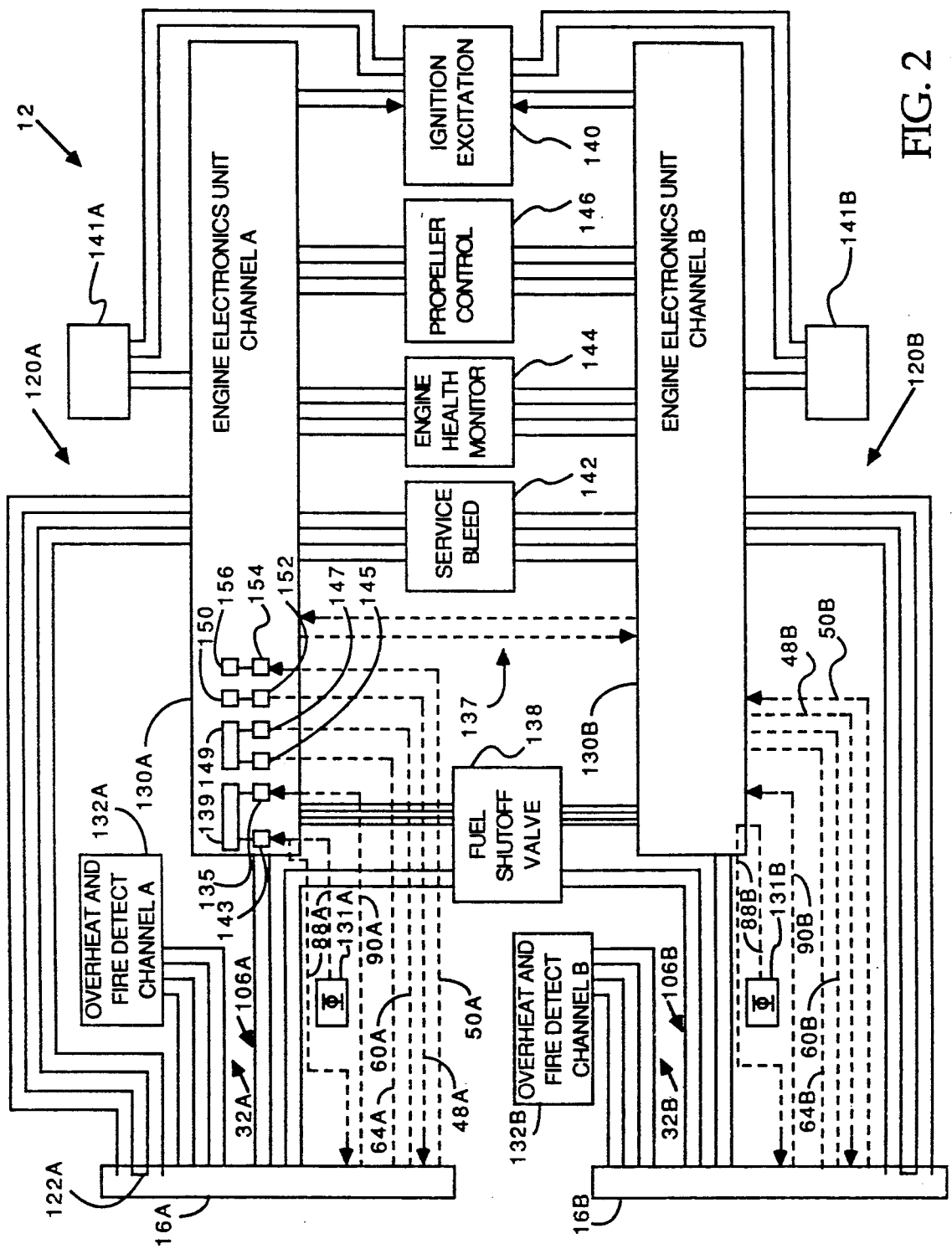
FIG. 2 is a simplified block diagram of the right propulsion module of FIG. 1.

FIG. 2 illustrates sense and control subsystem 20 in greater detail. Channel 20A of sense and control subsystem 20 is powered by generator 141A and includes programmable engine electronics unit 130A, phase sensor 131A, and overheat and fire detect unit 132A. Similarly, channel 20B is powered by generator 141B and includes programmable engine electronics unit 130B, phase sensor 131B, and overheat and fire detector unit 132B. FIG. 2 also shows fuel shutoff valve 138, ignition excitation unit 140, service bleed 142, engine health monitor 144, and propeller control 146, each of which has two electrically separate interfaces to channels 20A and 20B, respectively.

Engine electronics units 130A and 130B are functionally identical, independently powered, and identically programmed with one (e.g. 130A) being designated as the master and the other (130B) the slave. Generator 141A, driven by engine 15, delivers power to engine electronics unit 130A, independently of unit 130B, while generator 141B, also driven by engine 15, delivers power to unit 130B. An optic fiber link 137 couples engine electronics unit 130A with engine electronics unit 130B. The master engine electronics unit 130A maintains a signal on one of optic fibers 137 informing the slave engine electronics unit 130B that the master engine electronics is able to control the engine. If the master engine electronics unit 130A detects that it is unable to control the engine, or if the master becomes inoperable, then the signal from the master to the slave ceases and the slave engine electronics unit 130B assumes control of the engine. Otherwise, slave engine electronics unit 130B does not participate in controlling the engine.

Overheat and fire detect unit 132A is connected to right engine overheat and fire display 30 of airframe 10 (FIG. 1) by way of conductors 32A. Overheat and fire detect unit 132A is electrically isolated from all other parts of the electronic sense and control subsystem 20 and communicates directly with the airframe 10 because it is possible to have an engine fire when the engine is not running or the engine electronics units are without power. For similar reason, conductor 32A includes power supply wires for receiving operating power from airframe 10, so that overheat and fire detect unit 132A is not dependent on the engine for operating power.

Phase sensor 131A transmits a pulse into optic fiber 88A each time the right engine passes through a given angular position. The transmitted phase information is delivered to engine electronics unit 130A and to left propulsion module 14 (FIG. 1) by way of optic fiber 88A such that unit 130A and left propulsion module 14 receive right engine phase information. Electro optic transducer 143 monitors optic fiber 88A and delivers phase information generated by sensor 131A to phase detector 139 of unit 130A. Similar left engine phase information is received by engine electronics unit 130A through optic fiber 90A. Engine electronics unit 130A includes electro optic transducer 135 coupled to optic fiber 90A for converting optic signals arriving through fiber 90A into electrical signals and delivering the electrical signals to phase detector 139 for evaluation by engine electronics unit 130A and for computing engine RPM. Upon receipt of an engine synchronization command, right engine electronics unit 130A may compare the left engine RPM to the right engine RPM in order to determine which engine is selected to be the master and, if the right engine is selected to be the slave, then whether an RPM adjustment is required. Engine electronics unit 130A may also compare engine phase and provide a phase adjustment if necessary.

Connector 16A is coupled to engine electronics unit 130A by conductor 120A which, as previously mentioned, comprises four wires. Within connector 16A, jumper 122A connects a selected pair of the four wires and thereby configures engine electronics unit 130A so that propulsion module 12 operates as the right propulsion module. At least one pair of the wires of conductor 120A is connected by a jumper so that if engine electronics unit 130A finds that none of the wires of conductor 120A are connected, engine electronics unit 130A will register a fault. Unit 130A will relinquish control of the right propulsion module to engine electronics unit 130B if it determines that the faults that have been registered indicate it is no longer capable of engine control.

Engine electronics unit 130A communicates with airframe 10 (FIG. 1) through connector 16A, receiving thrust commands by way of optic fiber 50A, communicating with bus 56 and bus 58 (FIG. 1) through optic fibers 60A and 64A, and receiving a ground test power control signal from flight deck control 84 (FIG. 1) by way of two of the four wires comprising conductor 106A. The remaining two wires of conductor 106A deliver a high pressure fuel valve shutoff control signal from flight deck control 84 to the "closed" solenoid (or motor) winding of fuel shutoff valve 138.

Within engine electronics unit 130A, electro optic transducers 145 and 147 couple optic fibers 60A and 64A, respectively, to a multiplexer/demultiplexer 149 for providing multiplexed communication between engine electronics unit 130A and buses 56 and 58. Engine electronics unit 130A also includes a thrust excitation signal generator 150 coupled to an electro optic transducer 152 for injecting an optic excitation signal into optic fiber 48A. Electro optic transducer 154 receives the modulated optic thrust command from optic fiber 50A and delivers the thrust command in electrical form to modulation detector 156 for interpretation by engine electronics unit 130A.

Fuel shutoff valve 138 is controlled from flight deck control 84 (FIG. 1) which issues a fuel-off command directed to valve 138 by way of conductor 106A. Fuel shutoff is independent of engine electronics units 130A and 130B since it may be necessary to shut off fuel at a time when the engine electronics units are inoperative. A fuel-on command is delivered to valve 138 by way of engine electronics unit 130A, but the fuel-off command received from control 84 has priority over the fuel-on command received from engine electronics unit 130A. In prior control systems, it was necessary to communicate the status of the fuel shutoff valve to a display device on airframe 10 by way of dedicated wires. However, because engine electronics unit 130A operates on bus 56 and bus 58, engine electronics unit 130A may be coupled to fuel shutoff valve 138 to determine its status and deliver data pertaining to its status to a display indicator on airframe 10 by way of bus 56 and bus 58. In this capacity, engine electronics unit 130A serves as an intermediary for delivering fuel shutoff valve information to airframe 10 without a need for dedicated wires. Engine electronics unit 130A connects to valve 138 by way of four separate conductors, two delivering the fuel-on command to valve 138 and two delivering information regarding the status of valve 138 to engine electronics 130A.

Because engine electronics unit 130A has direct access to bus 56 and bus 58, all aircraft data is available to engine electronics unit 130A, making it possible to integrate additional control functions into engine electronics unit 130A without the cost of routing additional wiring through connector 16A. Additional devices controlled by engine electronics unit 130A include ignition excitation unit 140, service bleed 142, engine health monitor 144, and propeller control 146.

Flight deck control 84 commands an airframe power source (not shown) to provide power to a motor (not shown) to rotate engine 15 and initiate a start sequence. As engine 15 begins to rotate, generators 141A and 141B deliver power to units 130A and 130B, respectively, and to ignition excitation unit 140. The engine start sequence requires that the engine be rotating above a certain RPM and ignition excitation be present before fuel enters the engine. In prior control systems, dedicated wires were required for communication between an ignition excitation unit and the flight deck control in order to start the engine. In the preferred embodiment of the present invention, an engine start is initiated in flight deck control 84 (FIG. 1), as described above, and a "start initiated" signal is transmitted to right propulsion module 12 by way of bus 56 and bus 58 thereby avoiding a need for dedicated wires pertaining to an engine start command. When the engine RPM reaches the proper speed, engine electronics unit 130A commands ignition "on" to ignition excitation unit 143 and fuel "on" to fuel shutoff valve 138.

Ignition excitation unit 140 is also responsible for maintaining constant ignition excitation when needed. Constant ignition excitation is required at times of heavy turbulence or precipitation, which could result in engine flameout, and during critical flight maneuvers such as takeoff and landing. Engine electronics unit 130A may be programmed to provide a constant ignition command to ignition excitation unit 140 in response to a pilot generated command delivered via bus 56 and bus 58, such as at times of heavy turbulence or precipitation, or in response to conditions indicating that the aircraft is executing a takeoff or landing maneuver.

Service bleed 142 includes a service bleed valve which removes air from the engine for use on the air frame such as for fresh air, cabin pressurization, air conditioning and wing antiicing. Engine electronics unit 130A receives information from the environmental control system within computer and control systems 80 of airframe 10 (FIG. 1) by way of bus 56 and bus 58

(FIG. 1). In this manner, the environmental control system may communicate directly with engine electronics unit 130A without requiring dedicated wires therebetween and without pilot involvement. Once engine electronics unit 130A receives information as to how much air is needed to satisfy the environmental control system, engine electronics unit 130A executes an appropriate command to service bleed 142 to operate the service bleed valve.

Engine health monitor 144 collects data from engine sensors such as low speed rotor RPM, high speed rotor RPM, exhaust gas temperature, engine pressure ratio, stator vane angle, stability bleed valve positions, position of the modulated bleed valve, inlet air temperature, and burner pressure. This information is not necessarily sent to the pilot, but is conducted by way of engine electronics unit 130A out onto bus 56 and bus 58 for delivery to computer and control systems 80 (FIG. 1) where it is stored in the central maintenance computer for subsequent analysis or down loading to a ground system where it may be analyzed for a determination as to whether or not a particular engine should be removed or repaired.

Propeller control 146 adjusts propeller pitch which may affect engine RPM and is used to effect a reverse thrust command. Propeller control 146 is coupled to engine electronics unit 130A by two pairs of signal conductors, one pair carrying a control signal for propeller pitch and the other pair carrying a reverse thrust enable signal. Both the pitch command signal for reverse propeller pitch and the reverse thrust enable signal originate in right engine thrust control 46 (FIG. 1), but they arrive at propeller control 146 by different paths. The pitch control signal is a function of the position of the thrust control lever on control 46 and engine electronics unit 130A receives this information directly by way of optic fibers 48A and 50A in the form of a thrust command. Engine electronics unit 130A interprets the thrust command in light of the current engine conditions and establishes the desired thrust by adjusting the fuel supplied to the engine and by adjusting propeller pitch through control 146. A reverse thrust command is issued by placing the thrust lever in the reverse thrust range and activating the reverse enable switch of control 46. The reverse enable switch then places a reverse thrust enable command on bus 56 and bus 58 and the reverse thrust enable command is delivered to engine electronics unit 130A by way of optic fibers 60A and 64A. Engine electronics unit 130A then relays the reverse thrust enable command to propeller control 146 which executes a reverse propeller pitch condition only when a reverse thrust command and a reverse thrust enable command are both present.

Thus, the aircraft propulsion control system illustrated in FIGS. 1 and 2 provides for integration of engine command and data functions into the engine electronics units permitting the engine electronics units to make decisions within the propulsion module based upon information taken from the data buses and engine sensors with fewer signal path connections in the airframe/propulsion module interface than are needed in conventional commercial aircraft. Because the engine electronics units have direct access to the data buses, the engine electronics units are given a greater role in such functions as propeller pitch, collecting long term engine health data, sensing fuel shutoff valve position, and controlling service bleed. With less signal carrying connections in the airframe/propulsion module interface, the potential for connector failure is reduced and the overall reliability of the aircraft is increased.

It will be appreciated that the present invention is not restricted to the particular embodiment that has been described and illustrated, and that variations may be made therein without departing from the scope of the invention as defined in the appended claims and equivalents thereof. For example, the engine might be provided with two (fore and aft) propellers, which are independently controllable as to RPM, phase and pitch, in which case phase sensors 131A and 131B may be used to sense the phase of the fore and aft propellers respectively.

I claim:

1. An aircraft comprising an airframe, at least one aircraft propulsion module attached to the airframe, and interconnect means for passing signals between the propulsion module and the airframe, said interconnect means comprising:
   electrically conductive bus means forming a portion of said airframe, said bus means being electrically isolated from the propulsion module;
   optical communication means adapted to coupling to said aircraft propulsion module; and
   electro optic transducer means coupled to said optical communication means and said bus means for communicating signals between said aircraft propulsion module and said airframe.

2. An aircraft according to claim 1 wherein said optical communication means comprises a fiber optic light path.

3. An aircraft according to claim 1 wherein said airframe includes thrust control means and said interconnect means further comprises second optical communication means coupling said aircraft propulsion module and said thrust control means.

4. An aircraft according to claim 3 wherein said second optical communication means comprises a fiber optic light path.

5. An aircraft according to claim 1 wherein said airframe includes control systems in communication with said electrically conductive bus means.

6. An aircraft according to claim 1 wherein said propulsion module includes at least one engine electronics unit and engine health sensors, said engine electronics unit being coupled to said engine health sensors for collecting long term engine health data and delivering the long term engine health data to said bus means.

7. An aircraft according to claim 1 wherein said propulsion module includes at least one engine electronics unit and a service bleed valve, said service bleed valve being controlled by said engine electronics unit whereby said engine electronics unit may receive service bleed valve commands from said bus means and execute said service bleed valve commands.

8. An aircraft comprising:
   an airframe,
   at least one aircraft population module attached to the airframe and including an engine, a propeller, at least one engine electronics unit, at least one engine condition sensor, and a propeller control for controlling propeller pitch, said engine electronics unit being coupled to said engine condition sensor for determining the operating condition of said engine, and said propeller control being controlled by said engine electronics unit, interconnect means for passing signals between the propulsion module and the airframe, said interconnect means comprising:

electrically conductive bus means forming a portion of said airframe;

optical communication means adapted for coupling to said engine electronics unit; and electro optic transducer means coupled to said optical communication means and said bus means for communicating signals between said engine electronics unit and said airframe, whereby said engine electronics unit may collect data from said bus means and from said engine condition sensor for controlling said propeller control.

9. An aircraft according to claim 1 wherein said propulsion module includes an engine, at least one engine electronics unit, a fuel shutoff valve, and an ignition excitation unit whereby said engine electronics unit provides ar engine start sequence in response to a start initiated signal taken from said bus means, said engine start sequence causing said ignition excitation unit to deliver ignition power to said engine and causing said fuel shutoff valve to deliver fuel to said engine.

* * * * *

UNITED STATES PATENT AND TRADEMARK OFFICE
CERTIFICATE OF CORRECTION

PATENT NO. : 5,136,841　　　　　　　　　　　Page 1 of 2
DATED : August 11, 1992
INVENTOR(S) : Ward H. Zimmerman It is certified that error appears in the above-identified patent and that said Letters Patent is hereby corrected as shown below:

Column 3, line 67, "functions. (Engine" should read --functions. Engine--.

Column 4, line 50, "nodule" should read --module--.

Column 5, line 10, "opt-c" should read --optic--.

Column 5, line 26, ":s" should read --is--.

Column 8, line 16, "15A and 16B" should read --16A and 16B--.

Column 10, line 48, "unit 143" should read --unit 140--.

Column 10, line 65, "antiicing" should read --anti-icing--.

Column 12, line 24, "adapted to coupling" should read --adapted for coupling--.

UNITED STATES PATENT AND TRADEMARK OFFICE
CERTIFICATE OF CORRECTION

PATENT NO. : 5,136,841

DATED : August 11, 1992

INVENTOR(S) : Ward H. Zimmerman

It is certified that error appears in the above-indentified patent and that said Letters Patent is hereby corrected as shown below:

Column 14, line 8, "ar engine" should read --an engine--.

Signed and Sealed this

Ninth Day of November, 1993

Attest:

BRUCE LEHMAN

*Attesting Officer*   *Commissioner of Patents and Trademarks*